(No Model.)

J. F. WELLINGTON.
AUTOMATIC REEL GUIDE.

No. 516,715. Patented Mar. 20, 1894.

Witnesses
John Irvine
Chas. E. Brock

Inventor
J. F. Wellington
by John Wedderburn
Attorney

UNITED STATES PATENT OFFICE.

J. FARNUM WELLINGTON, OF ST. PAUL, MINNESOTA.

AUTOMATIC REEL-GUIDE.

SPECIFICATION forming part of Letters Patent No. 516,715, dated March 20, 1894.

Application filed March 2, 1893. Serial No. 464,450. (No model.)

*To all whom it may concern:*

Be it known that I, J. FARNUM WELLINGTON, of St. Paul, in the county of Ramsey and State of Minnesota, have invented a certain new and useful Automatic Reel-Guide; and I do hereby declare the following to be a full, clear, and exact description of the invention, such as will enable others skilled in the art to which it appertains to make and use the same.

My invention consists of an automatic reel guide, designed for its simplicity of construction and certainty and efficiency of operation, and by the use of which the line is evenly wound on the reel.

Other objects and advantages of the invention will appear in the following description in which I have set forth fully the details of construction and the essential features thereof and illustrated them in the accompanying drawings in which similar letters of reference designate corresponding parts.

Figure 1:
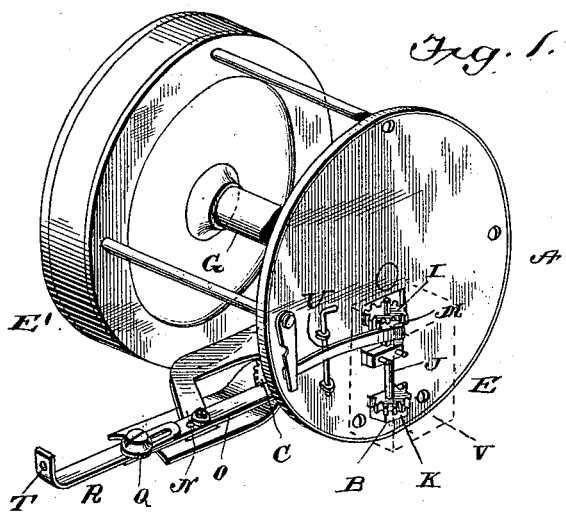
Figure 2:
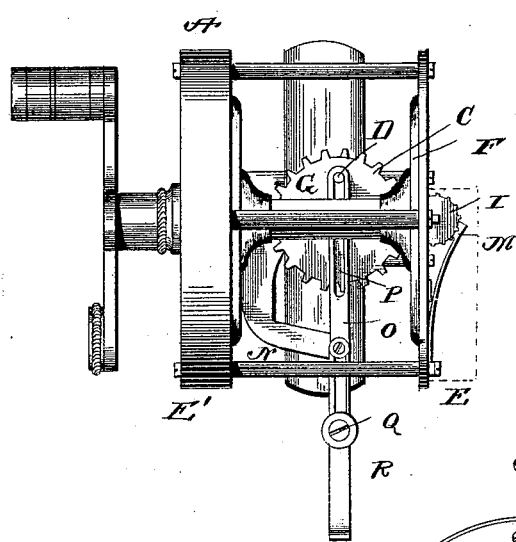
Figure 4:
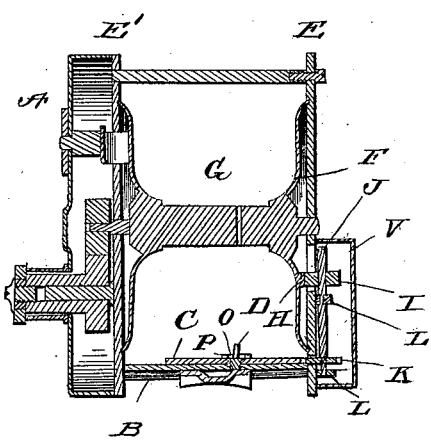
Figure 3:
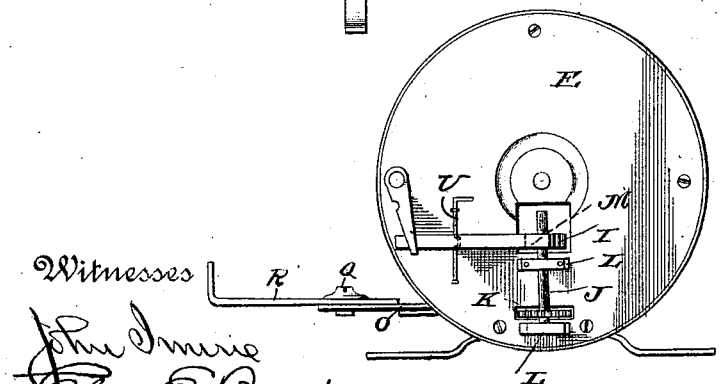

Figure 1 is a perspective view of my invention in connection with an ordinary reel. Fig. 2 is a plan view and Fig. 3 is a side elevation. Fig. 4 is a transverse vertical section of the reel mechanism.

Reference being had to the above figures A represents an ordinary multiplied motion, balanced-handle reel.

Revolubly secured to the center of the lower cross brace B is the cog wheel C near the circumference of which is rigidly secured the raised pin D.

Secured to the outer side of the flange F of the spool G is the projecting tooth H which, as the spool revolves, engages with the teeth of the small cog-wheel I secured to the shaft J, which revolves in bearings L secured to the disk E. On the lower end of the shaft J is situated the second cog-wheel K the teeth of which engage with the teeth of the large cog-wheel C.

Situated on the outer surface of the disk E is the spring pressed block M, its object being to prevent the shaft J from revolving by inertia after the projecting tooth H has passed the wheel I, and also to cause the desired click.

Extending outward and forward from beneath the wheel C and rigidly secured to the lower portion of the reel is the arm or support N to which is pivoted the lever O one end of which passes over the wheel C and contains the slot P into which projects the pin D, while at the other end is situated the set screw Q which holds the adjustable arm R, which has in the outer end thereof an opening T through which the line is adapted to pass.

In order to raise block M from contact with wheel H, when it is desired to avoid the hinderance or friction, I have supplied the revoluble lever or eccentric U, the operation of which will be readily understood from the drawings. It will be readily seen from Fig. 1 that when the spool is revolved, its motion is imparted to the wheel C, and by means of the pin D the pivoted lever O and arm R are caused to oscillate thereby guiding the line, and causing it to be wound evenly on the spool. The shaft J and cog wheels thereon are protected by the outer disk or plate V, which is made in the form of a box and incloses the said mechanism.

I am aware that changes in the form and proportion of parts of the device herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim, and desire to secure by Letters Patent, is—

1. In an article of the class described, the combination of a reel, a spool mounted therein with a tooth on one head thereof, gear mechanism in mesh with said tooth, a cog wheel C revolubly secured to said reel, and also engaging said gear mechanism, a slotted arm pivotally connected to the upper side of said cog wheel and a secondary slotted arm adjustably secured to the aforesaid arm, and adapted to have the line pass through one end thereof, substantially as described.

2. In an article of the class described, the combination of a reel frame and vertical shaft having bearings secured to one of the disks of said reel frame, and supplied with gear wheels I and K, a spool having a tooth on one of its heads engaging the uppermost of the said gear wheels on said shaft, a cog wheel revolubly mounted on said reel frame engaging the other gear wheel on said shaft, and said cog wheel having a wrist pin extending from the upper side thereof, a slotted arm engaging the said wrist pin, a secondary slotted arm attached to the aforesaid arm, and through one end of which the line is adapted to pass, a spring pressed block engaging the said uppermost one of the gear wheels on said shaft, and means in the form of a lever to release the said block from contact with the gear wheel with which it is adapted to engage, substantially as described.

In testimony whereof I have signed this specification in the presence of two subscribing witnesses.

J. FARNUM WELLINGTON.

Witnesses:
CHARLES C. HAYES,
S. M. HAYES.